United States Patent
Konrad

(10) Patent No.: US 10,316,560 B2
(45) Date of Patent: Jun. 11, 2019

(54) HINGE AND CLADDING WITH A HINGE

(71) Applicant: FACC AG, Ried im Innkreis (AT)

(72) Inventor: Wilfried Konrad, Gurten (AT)

(73) Assignee: FACC AG, Reid im Innkreis (AT)

( * ) Notice: Subject to any disclaimer, the term of this patent is extended or adjusted under 35 U.S.C. 154(b) by 0 days.

(21) Appl. No.: 15/757,164

(22) PCT Filed: Sep. 5, 2016

(86) PCT No.: PCT/AT2016/060049
§ 371 (c)(1),
(2) Date: Mar. 2, 2018

(87) PCT Pub. No.: WO2017/035553
PCT Pub. Date: Mar. 9, 2017

(65) Prior Publication Data
US 2018/0252012 A1  Sep. 6, 2018

(30) Foreign Application Priority Data
Sep. 4, 2015 (AT) .............................. A 50755/2015

(51) Int. Cl.
*E05D 11/06* (2006.01)
*E05D 3/18* (2006.01)
(Continued)

(52) U.S. Cl.
CPC .......... *E05D 3/186* (2013.01); *B64D 11/0638* (2014.12); *E05D 11/08* (2013.01);
(Continued)

(58) Field of Classification Search
CPC .... E05D 3/06; E05D 3/12; E05D 3/14; E05D 3/142; E05D 3/16; E05D 3/125;
(Continued)

(56) References Cited

U.S. PATENT DOCUMENTS 882,721 A * 3/1908 Soss .......................... E05F 3/20
16/358
1,687,271 A * 10/1928 Soss ........................ E05D 3/186
16/358
(Continued)

FOREIGN PATENT DOCUMENTS

AT  509093 A1  6/2011
AU  431315 B2  3/1969
(Continued)

OTHER PUBLICATIONS

International Bureau of WIPO, International Preliminary Report on Patentability Issued in Application No. PCT/AT2016/060049, dated Mar. 6, 2018, WIPO, 7 pages.
(Continued)

*Primary Examiner* — Chuck Y Mah
(74) *Attorney, Agent, or Firm* — McCoy Russell LLP

(57) ABSTRACT

A hinge for articulatedly connecting first and second components, with first and second hinge parts for fastening to the first and second components, respectively, with a first pivot arm which comprises a first articulation axis on the first hinge part and a second articulation axis on the second hinge part, wherein the first hinge part comprises a longitudinal guide for the first articulation axis of the first pivot arm, and with a second pivot arm which comprises a first articulation axis on the first hinge part and a second articulation axis on the second hinge part, wherein the first hinge part comprises a damping element, wherein the first pivot arm is connected to a braking element, wherein a setting element is provided which comprises a pressing part, which acts on the damping element, and an actuating part, wherein the actuating part is in an access hole of the first hinge part.

12 Claims, 9 Drawing Sheets

(51) Int. Cl.
*B64D 11/06* (2006.01)
*E05D 11/08* (2006.01)

(52) U.S. Cl.
CPC ....... *E05Y 2201/25* (2013.01); *E05Y 2201/26* (2013.01); *E05Y 2600/41* (2013.01); *E05Y 2900/502* (2013.01)

(58) Field of Classification Search
CPC .......... E05D 3/127; E05D 3/185; E05D 7/04; E05D 7/0423; E05D 7/0415; E05D 7/043; E05D 7/0027; E05D 7/0045; E05D 5/02; E05D 5/062; E05D 2007/0438; E05D 2007/0446; E05D 2007/0453; E05D 2007/0461; E05D 2007/0469; E05D 2007/0476; E05D 2007/0484; E05D 2007/0492; E05D 11/00; E05D 11/06; E05D 11/1014; E05D 11/1007; E05Y 2600/41; E05Y 2600/634; E05Y 2600/412; E05Y 2600/45; E05Y 2600/452; E05Y 2600/46; E05Y 2900/132; E05Y 2900/20; E05Y 2900/50; E05Y 2900/531; E05Y 2900/546; E05Y 2201/638; Y10T 16/547; Y10T 16/5474; Y10T 16/5475; Y10T 16/541; Y10T 16/54038

See application file for complete search history.

(56) References Cited

U.S. PATENT DOCUMENTS

| | | | | |
|---|---|---|---|---|
| 1,926,431 | A * | 9/1933 | Busch | E05F 1/1253 16/287 |
| 4,177,540 | A | 12/1979 | Gorton | |
| 4,875,252 | A * | 10/1989 | Falconer | E05D 3/186 16/288 |
| 5,715,573 | A * | 2/1998 | Holemans | B64G 1/222 16/287 |
| 5,918,347 | A * | 7/1999 | Morawetz | E05D 11/1071 16/274 |
| 6,487,755 | B1 * | 12/2002 | Caldari | E05D 3/186 16/287 |
| 8,746,154 | B2 | 6/2014 | Schoerkhuber et al. | |
| 8,982,542 | B2 * | 3/2015 | Bohn | G06F 1/1681 361/679.06 |
| 2003/0088943 | A1 * | 5/2003 | Neukotter | E05D 3/186 16/366 |
| 2005/0198778 | A1 * | 9/2005 | Neukotter | E05D 3/06 16/366 |
| 2007/0283535 | A1 * | 12/2007 | Hoffman | B60J 5/0473 16/366 |
| 2012/0090135 | A1 * | 4/2012 | Soh | E05D 11/0081 16/250 |
| 2012/0291225 | A1 * | 11/2012 | Liermann | E05D 3/186 16/364 |

FOREIGN PATENT DOCUMENTS

| | | | |
|---|---|---|---|
| CH | 411302 | A | 4/1966 |
| CN | 2534323 | Y | 2/2003 |
| DE | 1453819 | A1 | 4/1969 |
| DE | 1559816 | A1 | 12/1969 |
| EP | 1223278 | A1 | 7/2002 |
| EP | 1857624 | A1 | 11/2007 |
| GB | 1048526 | A | 11/1966 |
| JP | H0552181 | U | 7/1993 |
| JP | 06288139 | A * | 10/1994 ............. E05D 3/186 |
| WO | WO-2010143405 | A1 * | 12/2010 ............. E05D 3/12 |

OTHER PUBLICATIONS

ISA European Patent Office, International Search Report Issued in Application No. PCT/AT2016/060049, dated Nov. 22, 2016, WIPO, 4 pages.

* cited by examiner

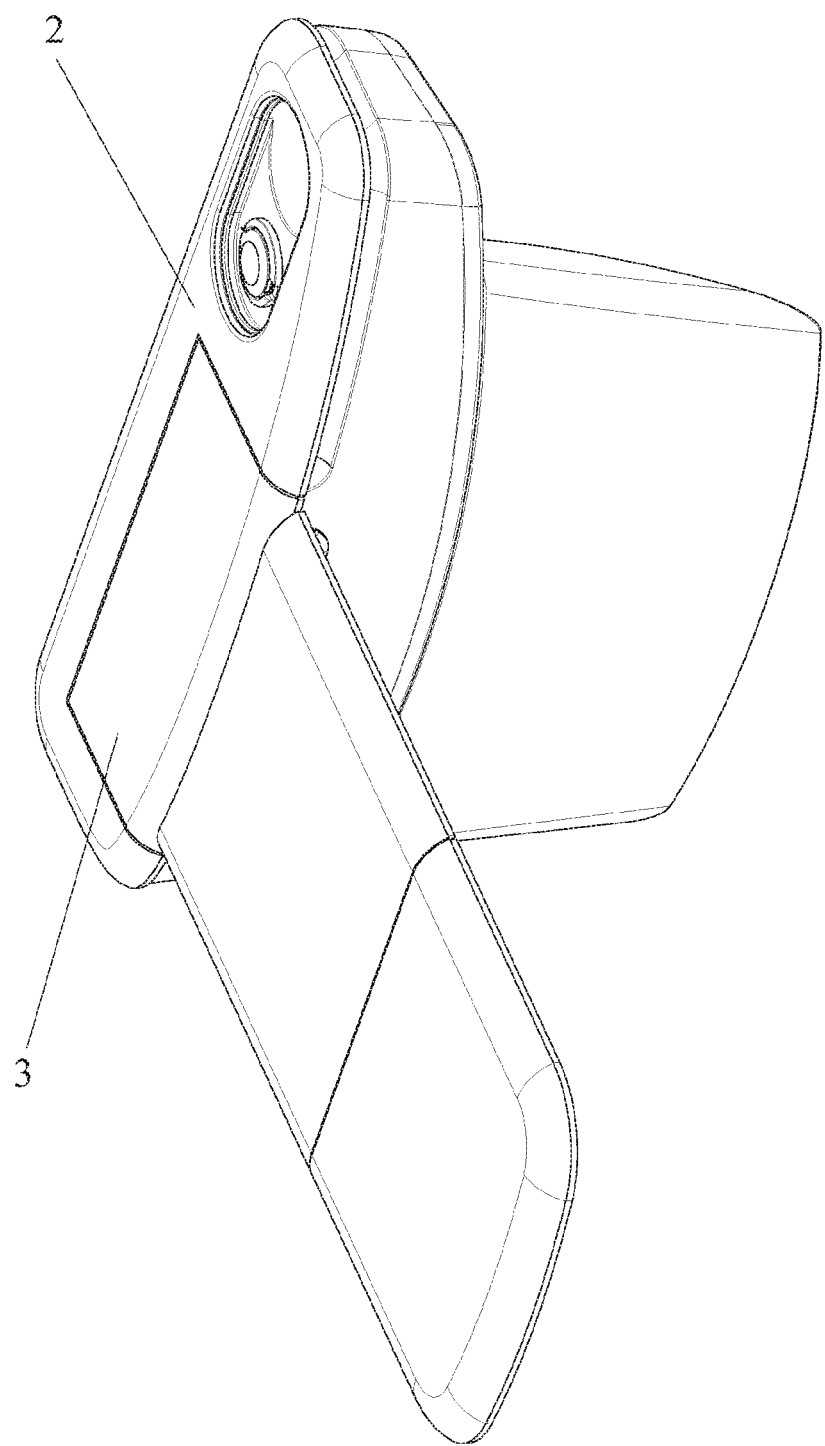

HINGE AND CLADDING WITH A HINGE

CROSS-REFERENCE TO RELATED APPLICATIONS

The present application is a U.S. National Phase of International Patent Application Serial No. PCT/AT2016/060049 entitled "HINGE AND CLADDING WITH A HINGE," filed on Sep. 5, 2016. International Patent Application Serial No. PCT/AT2016/060049 claims priority to Austrian Patent Application No. A 50755/2015, filed on Sep. 4, 2015. The entire contents of each of the above-cited applications are hereby incorporated by reference in their entirety for all purposes.

TECHNICAL FIELD

The invention relates to a hinge for articulatedly connecting a first component to a second component, with a first hinge part for fastening to the first component and with a second hinge part for fastening to the second component, with a first pivot arm which comprises a first articulation axis on the first hinge part and a second articulation axis on the second hinge part, wherein the first hinge part comprises a longitudinal guide for the first articulation axis of the first pivot arm, and with a second pivot arm which comprises a first articulation axis on the first hinge part and a second articulation axis on the second hinge part, wherein the second hinge part comprises a further longitudinal guide for the second articulation axis of the second pivot arm.

BACKGROUND AND SUMMARY

The invention further relates to a cladding for an aircraft interior, comprising a cladding element and a flap element, which are connected to one another via a hinge.

Such hinges have long been known in the prior art. The gap formed between the hinge parts during the pivoting process can be reduced by the displaceable mounting of one of the two articulation axes of the pivot arm. This hinge can be used in particular in aircraft tables.

The AU 431,315 B2 describes a hinge for connecting a window to a window frame, which has two hinge housings on which two sets of identical pivot arms are mounted. The pivot arms are connected to one another about a common pivot axis. The one ends of the pivot arms are mounted about a stationary pivot axis on the hinge housing, whereas the other ends of the pivot arms are mounted about a displaceable pivot axis on the hinge housing. The movable ends of the pivot arms are accommodated in nylon blocks, as a result of which the pivot movement is braked by means of frictional engagement. What is additionally shown is a way to adjust the frictional forces between the pivot arms and the nylon blocks.

As a disadvantage, in AU 431,315 B2 the frictional force between the pivot arms and the nylon blocks can only be adjusted laterally with the aid of the screw. If the hinge of AU 431,315 B2 were fully obstructed, a subsequent change in the frictional force would no longer be possible or only with great effort. For this purpose, the hinge would have to be demounted and then readjusted. In this procedure, multiple mounting and demounting might also be necessary to adjust the appropriate friction. If, on the other hand, the hinge is not fully obstructed, the adjustable screw is accessible in any position of the hinge, which could make undesirable adjustments possible.

EP 1 857 624 A1 and DE 1 559 816 A1 disclose further hinges.

Furthermore, a different type of hinge for aircraft tables is known from AT 509 093, in which two hinge parts are movably connected to one another via two pivot arms. The pivot arms are substantially U-shaped. In this prior art, the axes of rotation of the two pivot arms are each mounted in a fixed position, but offset with respect to one another.

Especially when large-area or heavy components are connected via the hinge, the problem arises in the prior art that the movable component may abruptly fall into the unfolded position. This makes it difficult to operate the components and can even bring about a risk of injury to the user. In order to avoid this, it is occasionally necessary in the prior art to guide the component manually over the entire opening process.

Accordingly, the object of the present invention is to alleviate or eliminate the disadvantages of the prior art. Therefore, the invention in particular aims at avoiding the abrupt folding over of one of the components in the installed state of the hinge. In particular, a hinge is to be provided which can be adjusted in a particularly simple manner.

To achieve this object, the invention provides a hinge for articulatedly connecting a first component to a second component, with a first hinge part for fastening to the first component and with a second hinge part for fastening to the second component, with a first pivot arm which comprises a first articulation axis on the first hinge part and a second articulation axis on the second hinge part, wherein the first hinge part comprises a longitudinal guide for the first articulation axis of the first pivot arm, and with a second pivot arm which comprises a first articulation axis on the first hinge part and a second articulation axis on the second hinge part, wherein the second hinge part comprises a further longitudinal guide for the second articulation axis of the second pivot arm, wherein the first hinge part comprises a damping element, so that a displacement of the first articulation axis of the first pivot arm along the longitudinal guide of the first hinge part is dampened, wherein the first pivot arm is connected to a brake element which is displaceable along a brake surface of the damping element, wherein a setting element for setting a contact pressure between the damping element and the braking element is provided, wherein the setting element comprises a pressing part, which acts on the damping element, and an actuating part which is accessible on an outer face of the first hinge part, wherein the actuating part of the setting element is arranged in an access hole of the first hinge part, wherein the access hole terminates at an end side of the first hinge part which end side faces the second hinge part; having the features of claim 1 and a cladding for an aircraft interior, with a cladding element and a flap element which are connected to each other by means of the hinge for articulatedly connecting the first component to the second component, wherein the first component is the cladding element and the second component is the flap element.

According to the invention, the first hinge part comprises a damping element, so that a displacement of the first articulation axis of the first pivot arm is damped along the longitudinal guide of the first hinge part.

Accordingly, the first hinge part is equipped with a damping element which is designed to slow down or delay the displacement of the first articulation axis of the first pivot arm, when the first hinge part is pivoted relative to the second hinge part. As a result, the damping element counteracts the pivoting of the first and second hinge parts relative to each other. Advantageously, an abrupt folding over of one of the components provided with the hinge can thus be reliably prevented. Thus, pivoting the first and second components between a first position and a second position relative to one another can be adapted relatively smoothly. Preferably, the first and second components are maximally pivotable about an angle of essentially 90° relative to one another.

Advantageously, in this embodiment of the hinge the distance between the first hinge part and the second hinge part can be kept low during the pivoting. The first and the second hinge part are preferably designed to be substantially identical. The first and the second pivot arms are preferably likewise substantially identical. The first or second pivot arm preferably comprises two sections which are arranged at an angle, in particular at an obtuse angle to one another. Preferably, the first or the second pivot arm is substantially V-shaped in this embodiment.

If the damping element is arranged at least partially within a recess of the first hinge part, the hinge can be designed in a particularly space-saving manner. As a result, the hinge can be used in comparatively thin-walled components, such as in a folding table for aircraft. Preferably, the damping element is arranged substantially completely in the recess of the first hinge part. In this embodiment, the damping element does not project beyond the outer surfaces of the first hinge part. As a result, the first hinge part can be provided with the damping element, without increasing the installation volume of the first hinge part. Preferably, the damping element is arranged substantially flush with one of the outer surfaces of the first hinge part. Advantageously, a substantially planar outer side of the first hinge part can thus be obtained with the damping element. The longitudinal guide for the first articulation axis is preferably likewise arranged in the recess of the first hinge part.

In order to slow down the pivoting of the first and second hinge parts relative to one another, it is advantageous that the first pivot arm is connected to a braking element, which is displaceable along a braking surface of the damping element. Upon pivoting the hinge parts, the first articulation axis of the first pivot arm is displaced in the longitudinal direction of the longitudinal guide. The displacement of the first articulation axis of the first pivot arm is transmitted to the braking element, which slides over the brake surface of the damping element. The damping element is preferably arranged in the recess of the first hinge part in such a way that the braking surface of the damping element is pressed against the contact surface of the braking element. As a result, the displacement of the braking element is counteracted by a frictional connection between the braking element and the damping element, as a result of which the pivoting movement between the hinge parts is damped or braked. To increase the friction between the braking element and the damping element, it is favorable when at least one of the longitudinal sides, which extend in the direction of the displacement of the braking element, of the braking element is designed as a contact surface which is in contact with the brake surface of the damping element essentially over the entire surface.

Preferably, the longitudinal guide comprises two guide tracks substantially extending in longitudinal direction of the first hinge part, in which guide tracks the ends of the first articulation axis of the pivot arm are guided. The guide tracks for the first articulation axis of the pivot arm are preferably arranged on lateral delimiting surfaces of the recess in which the damping element is accommodated.

The damping element is preferably made of a damping material which is different from the first hinge part. To increase the frictional engagement it is advantageous when the damping material is softer than the material of the first hinge part in the region of the longitudinal guide or the material of the braking element. As damping element preferably a plastic, in particular polyamide or Teflon is provided.

In order to increase the braking force of the damping element, it is advantageous when the damping element comprises a recess in which the braking element is displaceable along two brake surfaces of the damping element. In this embodiment, both longitudinal sides of the braking element are in contact with corresponding brake surfaces of the damping element, which delimit the recess for the guide of the braking element. The braking element preferably comprises a plate section with two planar longitudinal sides which are guided along planar brake surfaces of the damping element.

In order to transmit the displacement of the first articulation axis of the first pivot arm to the braking element, it is favorable when the braking element is connected to the first articulation axis of the first pivot arm. In this embodiment the braking element sits on the first articulation axis which is arranged on an end of the first pivot arm.

To be able to set the braking effect for a specific application, a setting element for setting a contact pressure between the damping element and the braking element is provided. By adjusting the setting element by a user, the contact pressure between the brake surface of the damping element and the contact surface of the braking element can be changed, in order to increase or reduce the braking effect during pivoting of the hinge parts.

To be able to press the damping element against the braking element to a higher or lesser extent, it is favorable that the setting element comprises a pressing part acting on the damping element and an actuating part accessible on an outer face of the first hinge part. For the adjustment of the braking effect the actuating part of the setting element can be adjusted by a user in the longitudinal direction thereof. Depending on the setting direction, the pressing part is pressed to a higher or lesser extent against the side of the damping element facing away from the braking element by means of the actuating part, as a result of which the contact pressure between the damping element and the braking element is increased or reduced.

In a simple construction the setting element is arranged in an access opening of the first hinge part, which access opening terminates at a side surface of the first hinge part which side surface preferably extends substantially in the direction of the displacement of the first articulation axis of the first pivot arm. This embodiment has the advantage that the setting element can be designed in a particularly simple manner, however, has the disadvantage that the side surface of the first hinge part, in the installed state of the hinge, is not accessible for adjusting the setting element.

In this embodiment it is advantageous when the access opening of the first hinge part for the setting element extends substantially perpendicularly to the direction of the displacement of the first articulation axis of the first pivot arm. When the actuating part and the pressing part are formed in one piece, a particularly simple setting element, in particular an adjusting screw can be used, which is arranged in the access opening of the first hinge part.

In order to make possible the adjustment of the braking effect in the installed state of the hinge, it is provided that the actuating part of the setting element is arranged in an access hole of the first hinge part, which access hole extends preferably essentially in the direction of displacement of the first articulation axis of the first pivot arm, wherein the access hole terminates at an end side of the first hinge part which end side faces the second hinge part. In the installed state of the hinge, the end face of the first hinge part is arranged on the first component so as to be freely accessible, so that the damping effect of the damping element can be changed by means of the setting element, without demounting the hinge from the components.

When the first and second hinge parts are positioned in the first position with the end sides arranged substantially parallel to one another, it can advantageously be achieved that the access hole for the setting element on the first hinge part is concealed by the second hinge part. As a result, this prevents an unintentional adjustment of the braking effect in the first position of the first and second hinge parts relative to one another.

In this embodiment, it is particularly favorable when the pressing part is arranged at an angle of preferably substantially 90° to the actuating part, wherein the pressing part is preferably arranged in an opening of the first hinge part, which opening extends substantially perpendicular to the direction of displacement of the first articulation axis of the first pivot arm.

To deflect the force between the actuating part and the pressing part, the actuating part and the pressing part preferably comprise corresponding conical parts. Accordingly, an adjustment of the actuating part via wedge surfaces of the conical parts can be converted into a displacement of the pressing part in a direction deviating therefrom. Preferably, the actuating part of the setting element is arranged essentially parallel to the direction of the displacement of the first articulation axis of the first pivot arm, and the pressing part is arranged substantially perpendicular to the direction of the displacement of the first articulation axis of the first pivot arm. In this embodiment, the pressing part can be adjusted via the actuating part essentially perpendicularly to the main plane of the damping element, in order to easily change the contact pressure between the damping element and the braking element.

To advantageously enable the hinge to be mounted on the first and second components in a space-saving and simple manner, the first hinge part comprises, on an end side preferably arranged substantially perpendicular to the direction of displacement of the first articulation axis of the first pivot arm, at least one mounting hole, in which a fastening element, in particular in the form of a screw can be arranged for fastening the first hinge part to the first component. Accordingly, the second hinge part can likewise comprise, on an end side preferably arranged substantially perpendicular to the direction of displacement of the second articulation axis of the second pivot arm, at least one mounting hole for the arrangement of such a fastening element for the fastening of the second hinge part on the second component. In the installed state of the hinge, the first or second hinge part is preferably arranged essentially completely in a corresponding recess of the first or second component, wherein the fastening element is fixed to the mounting hole to anchor the first and second hinge part to the first and second component, respectively. The first and second hinge part can thus be mounted essentially completely within the first and second component, respectively, without increasing the effective size of the first and second component.

In a preferred embodiment, the second hinge part comprises a further damping element for damping a displacement of the second articulation axis of the second pivot arm along the further longitudinal guide of the second hinge part. Such design is particularly suitable for a maximum pivot angle of substantially 90°.

To enable a guided pivoting movement of the first component relative to the second component and at the same time cause the first hinge part to approach the second hinge part upon pivoting the hinge parts in a position arranged in parallel to one another, it is favorable when the second articulation axis of the first pivot arm is arranged on the second hinge part and/or the first articulation axis of the second pivot arm is arranged on the first hinge part in an essentially stationary manner. For the purposes of this disclosure, "stationary" means that the second articulation axis of the first pivot arm or the first articulation axis of the second pivot arm is arranged to be non-displaceable on the first or second hinge part during the pivoting movement.

According to a particularly preferred embodiment, the first pivot arm and the second pivot arm are connected to one another via a common pivot axis, which extends in a parallel position of the first hinge part and the second hinge part preferably substantially centrally between the mutually facing end sides of the first hinge part and of the second hinge part. The common pivot axis is preferably formed by a pivot pin, which is partly accommodated in the first pivot arm and partly in the second pivot arm. The common pivot axis preferably extends substantially perpendicularly to the main plane of the first or second pivot arm.

In the case of a device with a first component and a second component, the hinge is provided according to one of the previously described embodiments.

BRIEF DESCRIPTION OF FIGURES

The invention will be further illustrated below on the basis of preferred exemplary embodiments, to which it is not to be restricted, however. In the drawing:

FIGS. 1A to 1C show schematic views of an aircraft table shown in the folded-out position, which can be stowed away in a side cladding of the aircraft interior, wherein the side cladding has a flap element, which can be pivoted by means of two hinges according to the invention between a folded-up position (FIG. 1A), an intermediate position (FIG. 1B) and a folded-in position (FIG. 1C);

DETAILED DESCRIPTION OF THE FIGURES

FIGS. 1 to 8 show embodiments of a hinge 1 for the articulated connection of a first component 2 to a second component 3. In FIGS. 1A to 1C, the hinge 1 can be seen in the state when installed on a side cladding in the aircraft interior. The side cladding has a cladding element and a movable flap element, which in this embodiment form the first component 2 and the second component 3. In the shown embodiment, two hinges 1 are arranged between the cladding element and the flap element. With the aid of the hinge 1, the flap element can be pivoted by substantially 90° relative to the cladding element. In the shown embodiment, the flap element is pivoted from an essentially vertical, folded-up position (FIG. 1A) over an intermediate position (FIG. 1B) into a substantially horizontal, folded-in use position (FIG. 1C). In the folded-up position according to FIG. 1A, the aircraft table can be stowed in the interior of the side cladding or pulled out of the storage space in the side cladding. In this position, the two hinges 1 are visible. In the folded-in state of the flap element according to FIG. 1C, the hinges 1 are arranged in a concealed manner, so that the hinges 1 are not visible from the outside. For this purpose, the hinges 1 are arranged substantially completely within corresponding recesses of the first component 2 or of the second component 3.

Figure 1A:
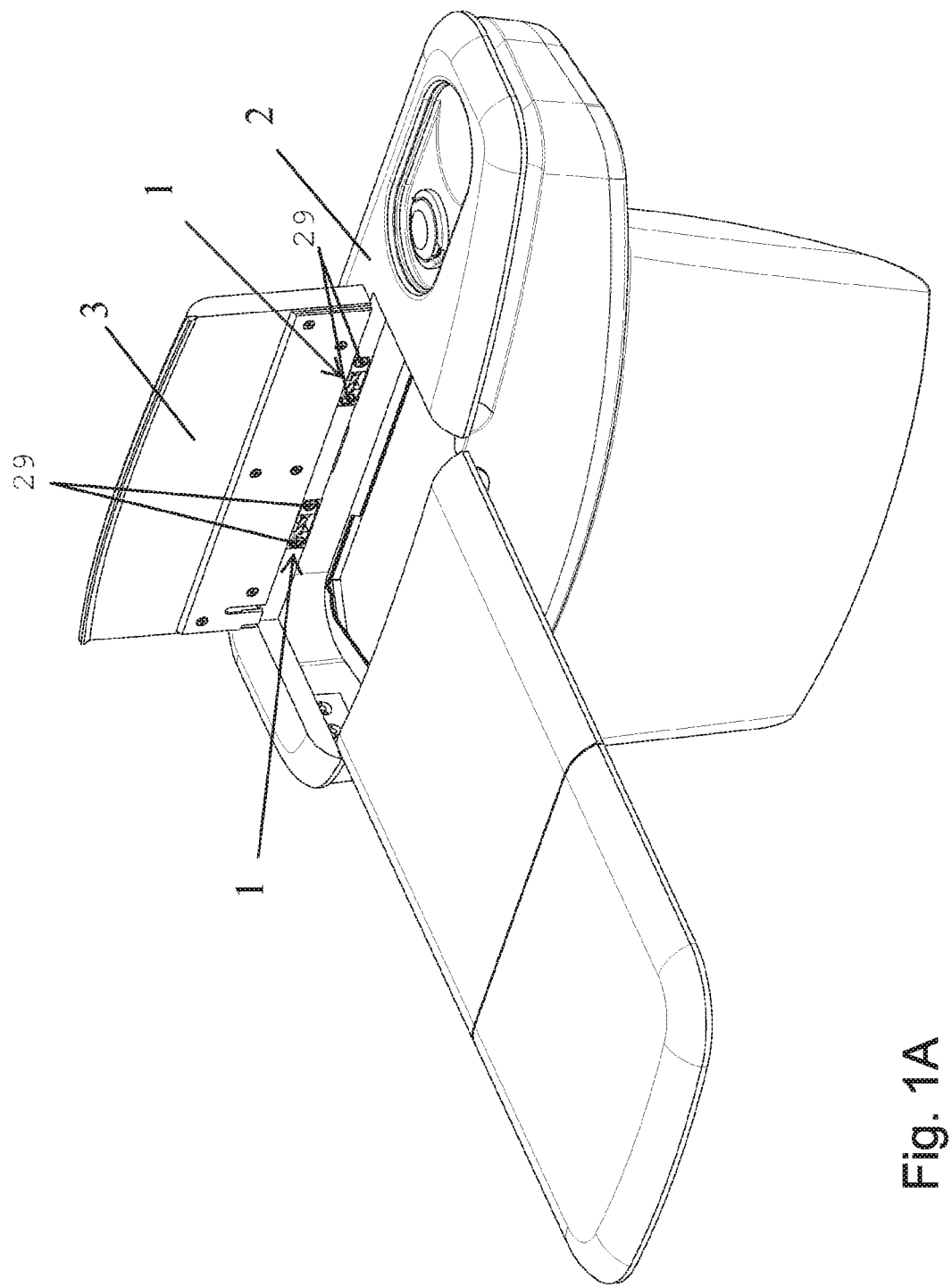
Figure 1B:
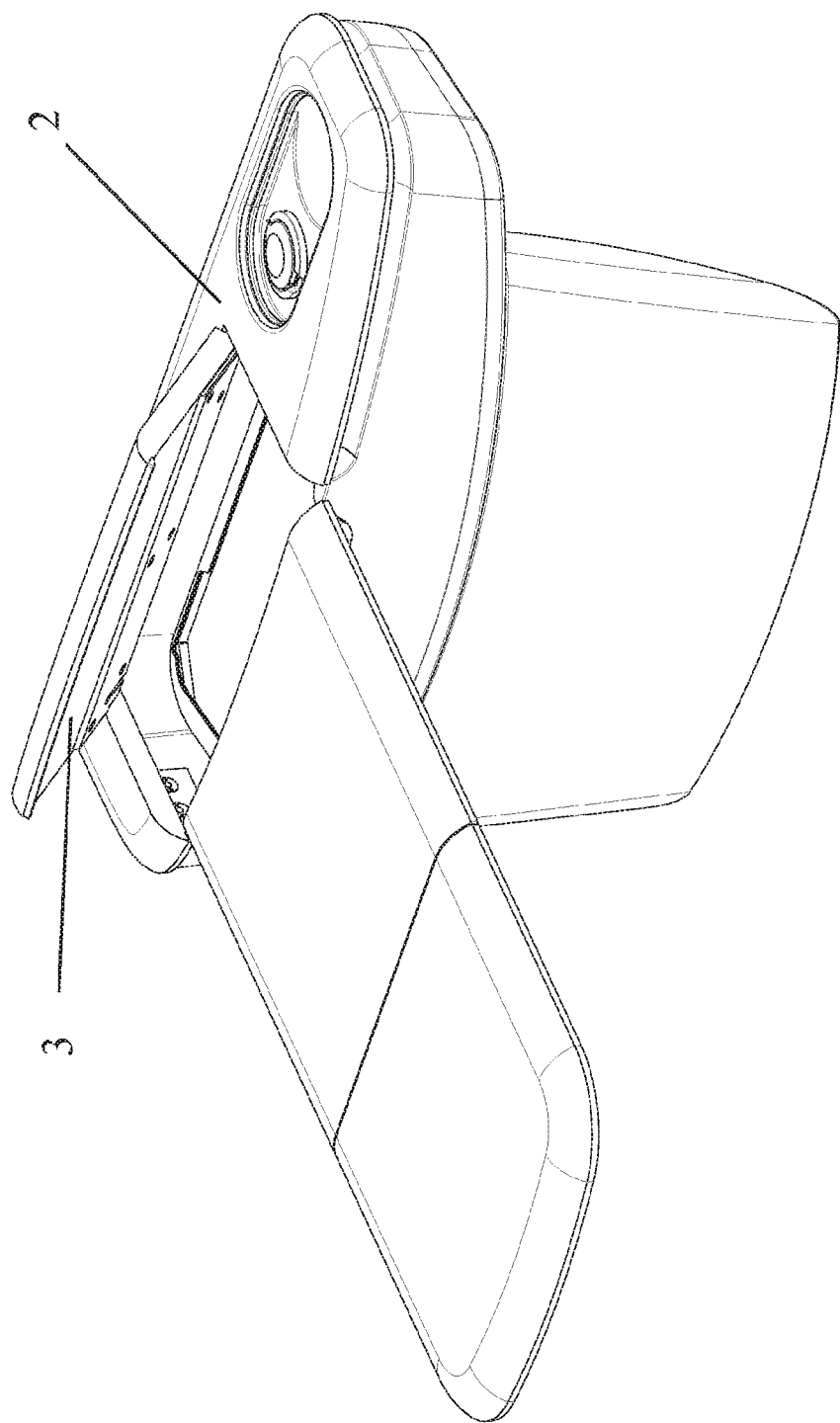
Figure 2:
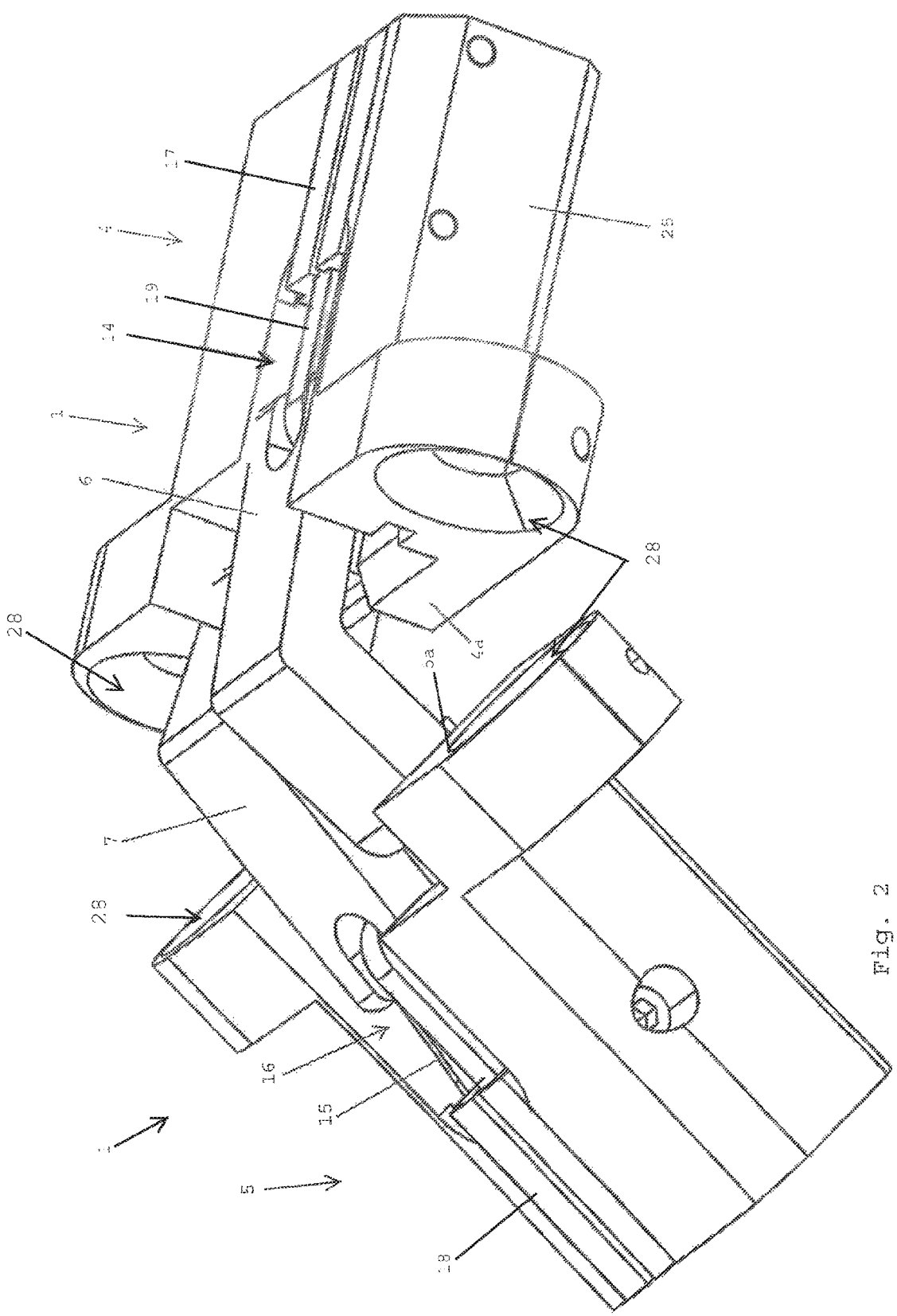
FIG. 2 shows a schematic view of a hinge according to the intention, comprising a first hinge part and a second hinge part.
Figure 5:
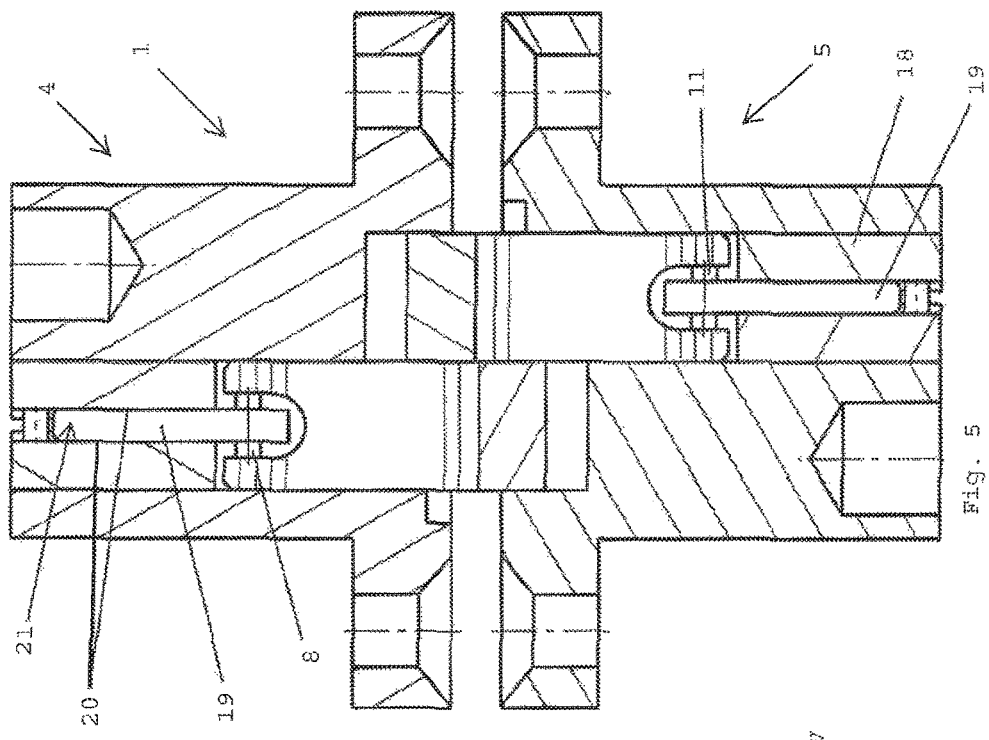
FIG. 5 shows a sectional view along the line V-V in FIG. 4.
Figure 3:
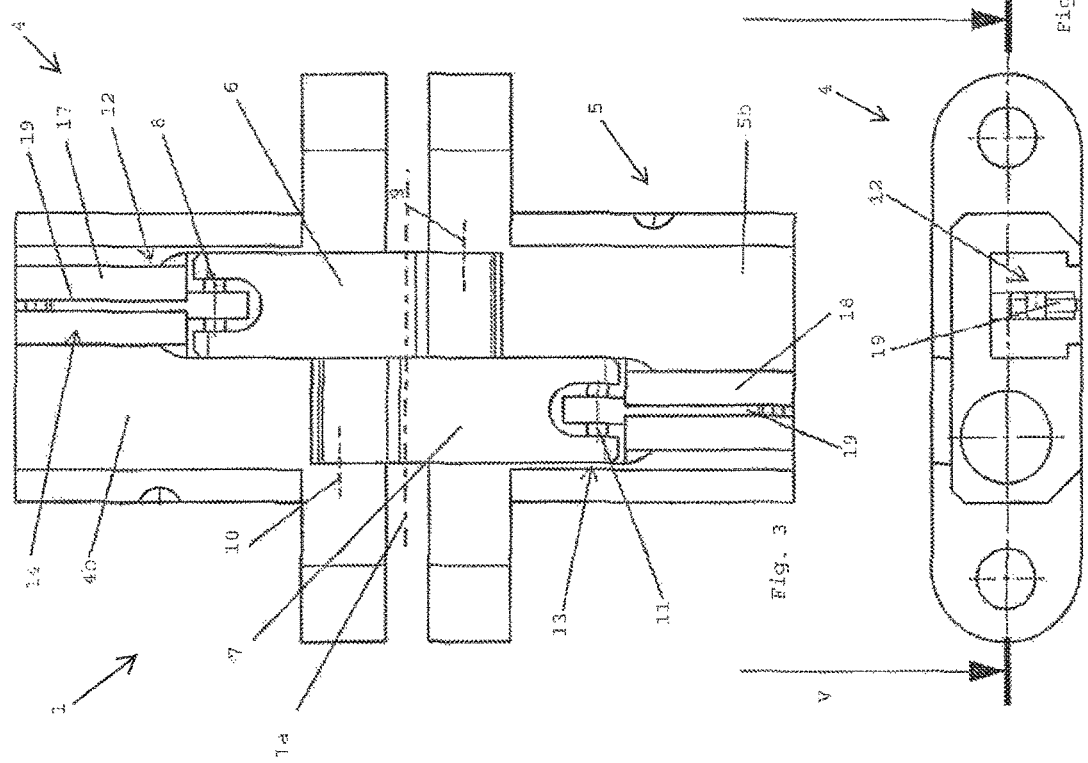
FIG. 3 shows a plan view of the hinge according to FIG. 2 in the second position of the hinge parts parallel to one another.
Figure 4:
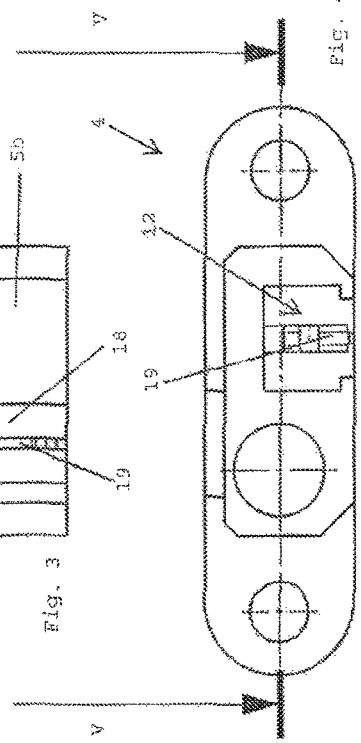
FIG. 4 shows a view of the rear side of the first hinge part facing away from the second hinge part.
Figure 6:
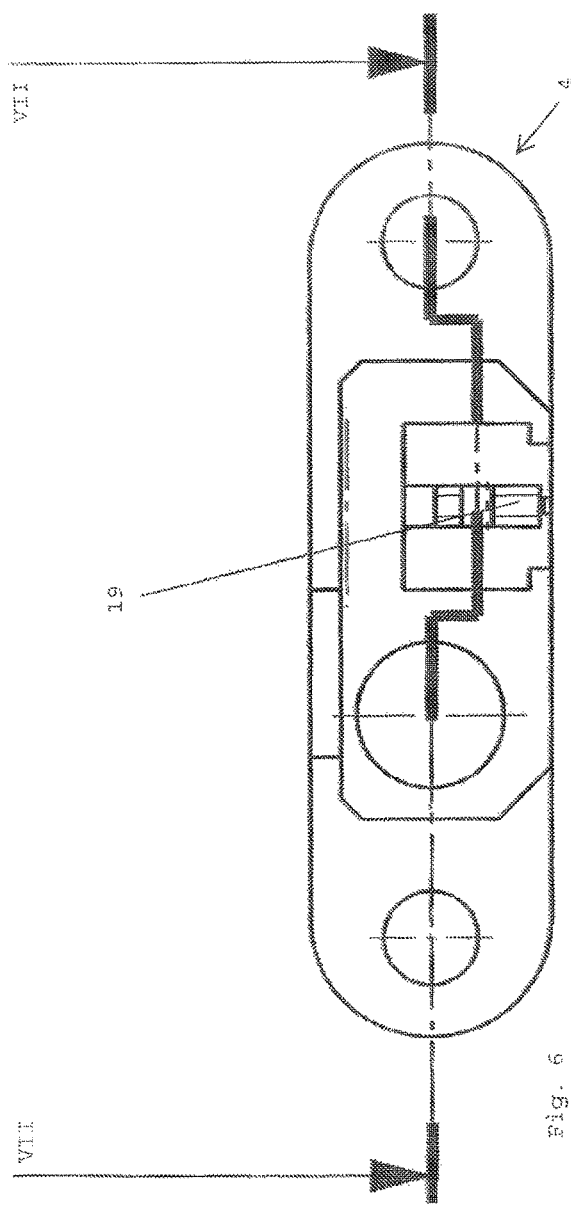
FIG. 6 shows a view corresponding to FIG. 4, wherein one sectional line VII-VII is plotted.

As can be seen from FIGS. 2 to 8, the hinge 1 comprises a first hinge part 4 to be mounted within the first component 2 and a second hinge part 5 to be fastened to the second component 3. The first hinge part 4 and the second hinge part 5 each comprise a planar end face 4a or 5a, which in the assembled state are arranged on corresponding end faces of the first component 2 and the second component 3, respectively. In order to mount the first hinge part 4 and the second hinge part 5 in a space-saving and simple manner in corresponding recesses of the first component 2 or of the second component 3, two mounting holes 28 are in each case arranged on the end side 4a of the first hinge part 4 and on the end face 5a of the second hinge part, in which mounting holes 28 fastening elements 29, in particular in the form of screws, can be arranged for fastening the first hinge part 4 to the first component 2 and the second hinge part 5 to the second component 3 (cf. FIG. 1A). For the articulated connection of the components 2, 3 to one another, the hinge 1 comprises a first pivot arm 6 and a second pivot arm 7 between the first hinge part 4 and the second hinge part 5. The first 6 and second pivot arms 7 are each substantially V-shaped. The first pivot arm 6 is connected via a first articulation axis 8 (first pivot pin 8) to the first hinge part 4 in an articulated manner and connected to the second hinge part 5 in an articulated manner via a second articulation axis (second pivot pin) shown schematically in FIG. 3. The second pivot arm 7 is designed correspondingly. Accordingly, the second pivot arm 7 comprises a first articulation axis 10 (first pivot pin 10), schematically shown in FIG. 3, on the first hinge part 4, and a second articulation axis 11 (second pivot pin 11) on the second hinge part 5. To form the first 8 and second articulation axis 9 of the first pivot arm 6 or the first 10 and the second articulation axis 11 of the second pivot arm 7, articulation pins or articulation bolts can be provided. The first pivot arm 6 and the second pivot arm 7 are also connected to one another via a common pivot axle (axis) 1a, which is schematically shown in FIG. 3. The common pivot axle 1a extends in the position in which the first 4 and the second hinge part 5 are arranged parallel to one another, i. e. in the folded-in position of the first 2 and second component 3, essentially centrally between the mutually facing end sides of the first 4 and the second hinge part 5. In the shown embodiment, a pivot pin is provided as the common pivot axle 1a, which pivot pin is arranged in corresponding recesses of the first pivot arm 6 and of the second pivot arm 7 (cf. also FIG. 9). Thus, the first 4 and second hinge part 5 can thus be moved relative to one another from a first position by preferably essentially 90° into a second position.

As can be seen from FIGS. 2 to 8, the hinge 1 comprises a first hinge part 4 to be mounted within the first component 2 and a second hinge part 5 to be fastened to the second component 3. The first hinge part 4 and the second hinge part 5 each comprise a planar end face 4a or 5a, which in the assembled state are arranged on corresponding end faces of the first component 2 and the second component 3, respectively. In order to mount the first hinge part 4 and the second hinge part 5 in a space-saving and simple manner in corresponding recesses of the first component 2 or of the second component 3, two mounting holes 28 are in each case arranged on the end side 4a of the first hinge part 4 and on the end face 5a of the second hinge part, in which mounting holes 28 fastening elements 29, in particular in the form of screws, can be arranged for fastening the first hinge part 4 to the first component 2 and the second hinge part 5 to the second component 3 (cf. FIG. 1a). For the articulated connection of the components 2, 3 to one another, the hinge 1 comprises a first pivot arm 6 and a second pivot arm 7 between the first hinge part 4 and the second hinge part 5. The first 6 and second pivot arms 7 are each substantially V-shaped. The first pivot arm 6 is connected via a first articulation axis 8 (first pivot pin 8) to the first hinge part 4 in an articulated manner and connected to the second hinge part 5 in an articulated manner via a second articulation axis (second pivot pin) shown schematically in FIG. 3. The second pivot arm 7 is designed correspondingly. Accordingly, the second pivot arm 7 comprises a first articulation axis 10 (first pivot pin 10), schematically shown in FIG. 3, on the first hinge part 4, and a second articulation axis 11 (second pivot pin 11) on the second hinge part 5. To form the first 8 and second articulation axis 9 of the first pivot arm 6 or the first 10 and the second articulation axis 11 of the second pivot arm 7, articulation pins or articulation bolts can be provided. The first pivot arm 6 and the second pivot arm 7 are also connected to one another via a common pivot axle (axis) 1a, which is schematically shown in FIG. 3. The common pivot axle 1a extends in the position in which the first 4 and the second hinge part 5 are arranged parallel to one another, i. e. in the folded-in position of the first 2 and second component 3, essentially centrally between the mutually facing end sides of the first 4 and the second hinge part 5. In the shown embodiment, a pivot pin is provided as the common pivot axle 1a, which pivot pin is arranged in corresponding recesses of the first pivot arm 6 and of the second pivot arm 7 (cf. also FIG. 9). Thus, the first 4 and second hinge part 5 can thus be moved relative to one another from a first position by preferably essentially 90° into a second position.

To keep the gap between the first 2 and second 3 components as low as possible in the folded-apart position, the first hinge part 4 comprises a longitudinal guide 12, in which the first articulation axis 8 of the first pivot arm 6 is displaceable in the longitudinal direction of the first hinge part 4, i. e relative to the assembled state of the hinge 1, essentially in the plane of the plate-shaped first component 2. On the other hand, the second articulation axis 9 of the first pivot arm 6 is mounted a stationary manner, that is to say the second articulation axis 9 is arranged so as to be not displaceable during the pivoting of the first 4 and second hinge part 5 with respect to one another. In the case of the second pivot arm 7 the arrangement of the stationary and of the displaceable articulation axis on the first 4 or second hinge part 5 is reversed. Accordingly, the first articulation axis 10 of the second pivot arm 7 is arranged substantially stationary on the first hinge part 4. On the other hand, the second hinge part 5 comprises a further longitudinal guide 13 for the second articulation axis 11 of the second pivot arm 7. For the formation of the longitudinal guide 12, the first hinge part 4 comprises a recess 14, wherein, on boundary surfaces of the recess 14, guide slots 15 extending essentially in the longitudinal direction of the first hinge part 4 are formed for the ends of the first articulation axis 8. The second hinge part 4 comprises corresponding guide slots 15 adjacent to a further recess 16, in which the ends of the second articulation axis 11 of the second pivot arm 7 are displaceable.

As can be seen from FIGS. 2 to 8, the first hinge part 4 comprises a damping element 17, which is designed to dampen or brake the longitudinal displacement of the first articulation axis 8 of the first pivot arm 6 during pivoting of the first hinge part 4 relative to the second hinge part 5. The second hinge part 5 comprises a further damping element 18 for damping the displacement of the second articulation axis 11 of the second pivot arm 7 along the further longitudinal guide 13 of the second hinge part 5. The further damping element 18 on the second hinge part 5 is substantially identical to the damping element 17 on the first hinge part 4. The following explanations relating to the damping element 17 (and the elements connected thereto) are therefore correspondingly related to the further damping element 18.

In the embodiment shown, the damping element 17 is arranged immovably in the recess 14 of the first hinge part 4. In this case, the damping element 17 is accommodated substantially completely within the recess 14, wherein the outer side of the damping element 17 terminates substantially flush with an outer surface 4b of the first hinge part 4. Accordingly, the outer side of the further damping element 18 is arranged in the same plane as the outer surface 5b of the second hinge part 5.

To dampen the pivoting of the first hinge part 4 relative to the second hinge part 5, the first pivot arm 6 is connected to a braking element 19, which is displaceable along an immovable brake surface 20 of the damping element 17. To this end, the damping element 17 comprises a recess 21 extending in longitudinal direction of the first hinge part 4, in which recess 21 the braking element 19 is accommodated. During the pivoting of the hinge parts 4, 5 relative to each other, the braking element 19 is displaced within the recess 21 of the damping element 17 along the brake surfaces 20 of the damping element 17. As a result of the friction between the movable braking element 19 and the immovable brake surfaces 20 of the damping element 17, the displacement of the first articulation axis 8 along the longitudinal guide 12 is slowed down, as a result of which the damping of the pivoting movement of the hinge 1 is realized. To increase the frictional effect, the brake surfaces 20 of the damping element 17 abut on the longitudinal sides of the braking element 19 while exerting a contact pressure. In the shown design, the braking element 19 is mounted on the first articulation axis 8 of the first pivot arm 6, so that the braking element 19 participates in the displacement of the first articulation axis 8 of the first pivot arm 6 in the longitudinal guide 12. The braking element 19 is provided in the form of a plate part whose longitudinal sides rest against the brake surfaces 20 of the damping element 19.

The braking effect of the damping element 17 is determined by the friction between the brake surfaces 20 of the damping element 17 and the longitudinal sides of the braking element 19.

Figure 7:
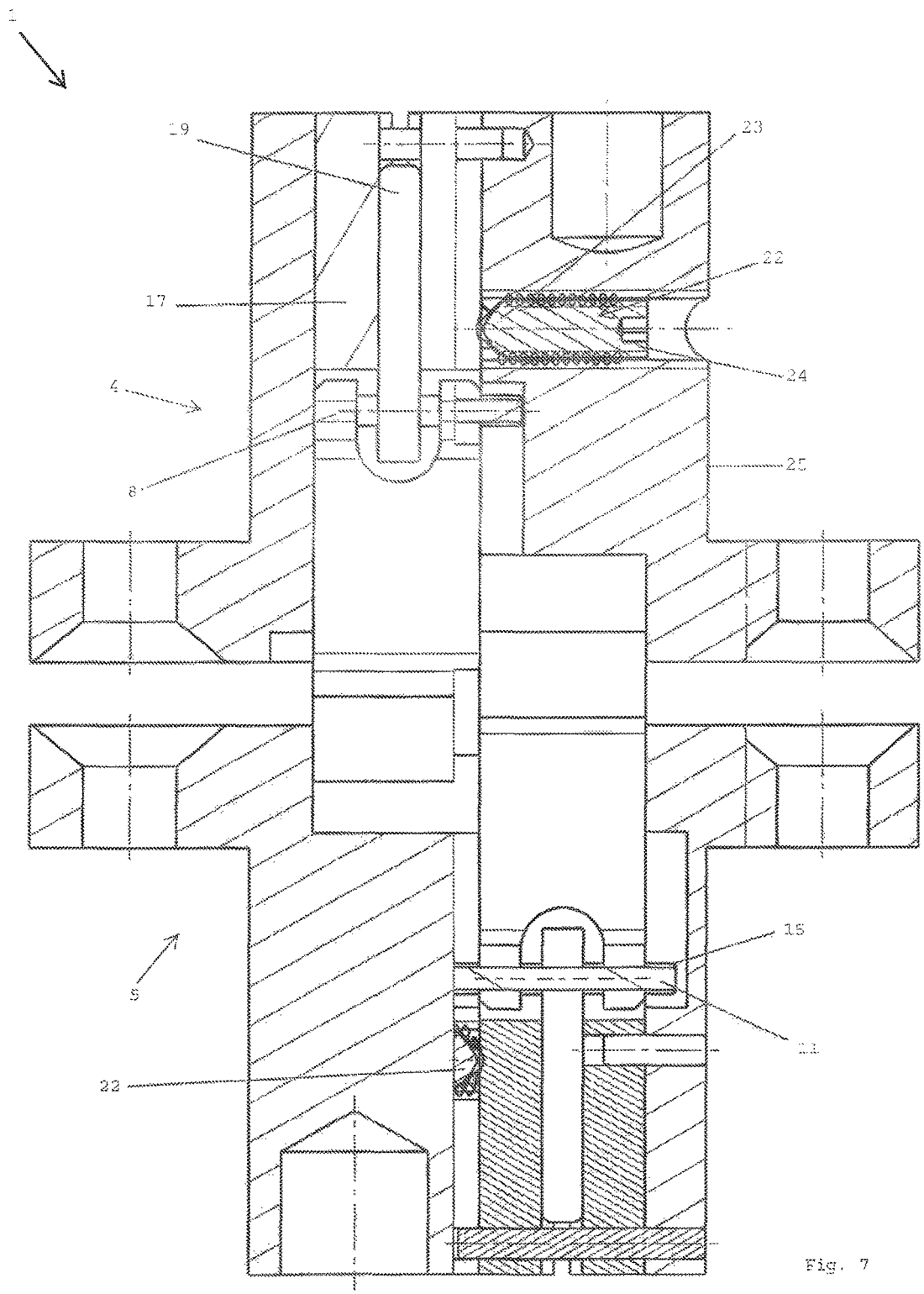
FIG. 7 shows a sectional view along the line VII-VII in FIG. 6.
Figure 8:
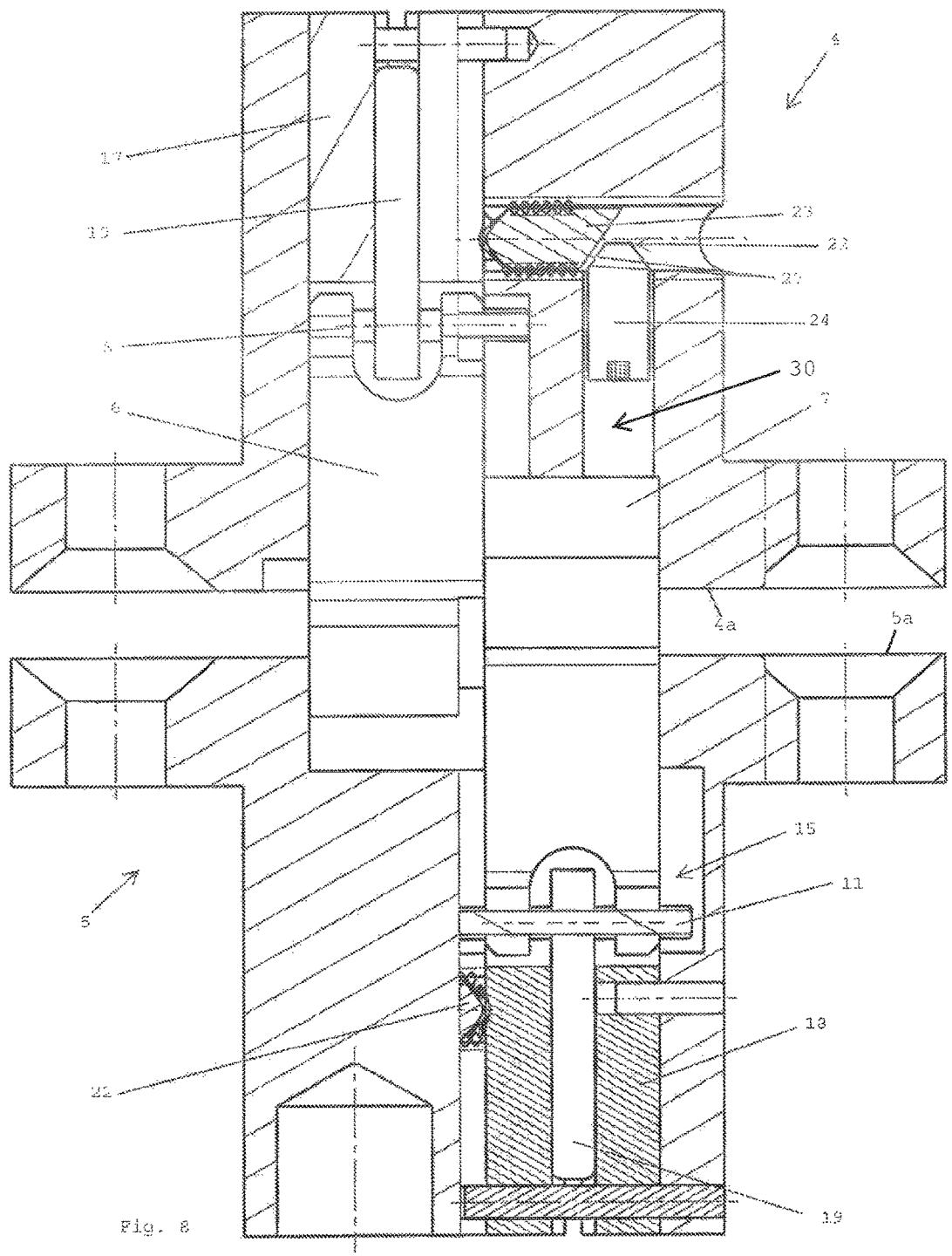
FIG. 8 shows a sectional view corresponding to FIG. 7 of an embodiment of the hinge according the invention.
Figure 9:
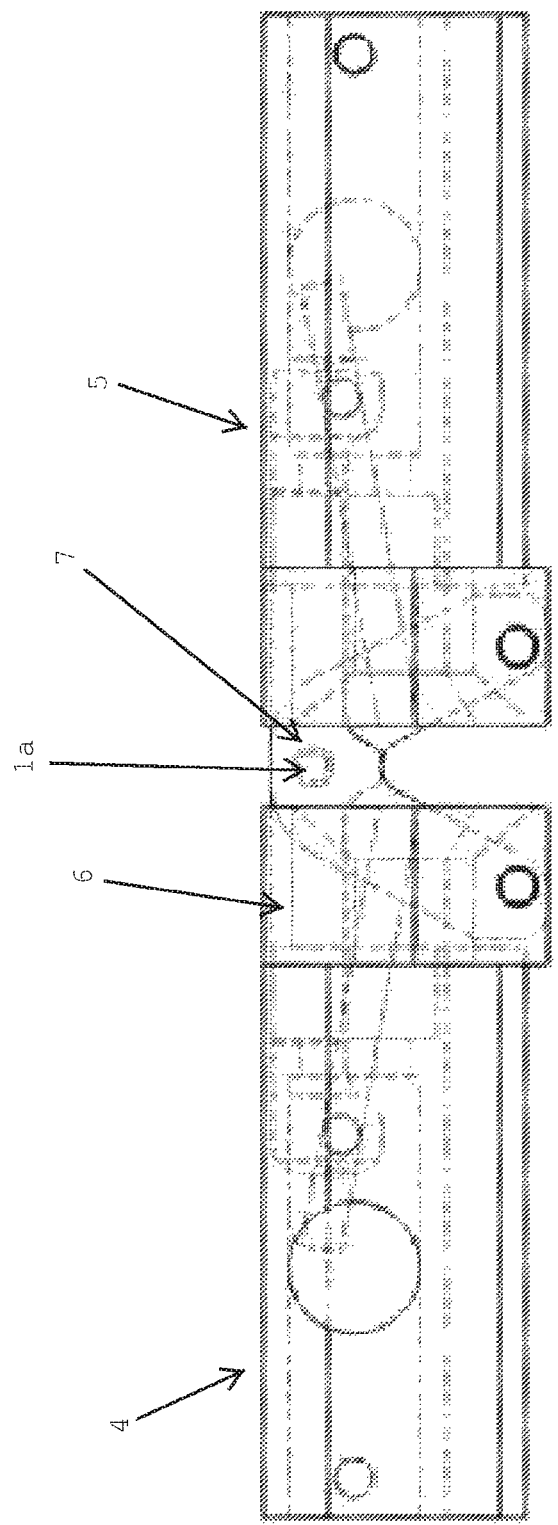
FIG. 9 shows a side view of the hinge according to the invention, wherein the common pivot axis of two pivot arms can be seen between the hinge parts.

According to the embodiments of hinge 1 of FIGS. 7 and 8, the first hinge part 4 each comprises a setting element 22 which is adapted for adjusting the contact pressure between the damping element 17 and the braking element 19. The second hinge part 5 comprises a corresponding setting element 22. By means of the setting element 22, the braking effect of the damping element 17 can be adapted to the respective application. The setting element 22 comprises a pressing part 23 which presses against the damping element 17 and an actuating part 24 which is exposed on an outer surface of the first hinge part 4 and can be actuated by a user.

According to FIG. 7 the pressing part 23 and the actuating part 24 of the setting element 22 are formed in one piece. In the shown embodiment the setting element 22 consisting of the pressing part 23 and the actuating part 24 is arranged substantially perpendicularly to the direction of displacement of the first articulation axis 8 of the first pivot arm 6. In this embodiment, the setting element 22 is formed by an adjusting screw which is arranged in an access opening of the first hinge part 4. The access opening of the first hinge part 4 ends on a side face 25 of the first hinge part 4 which side face 25 extends in the direction of displacement of the first articulation axis 8 of the first pivot arm 6. The contact pressure of the sliding element 17 on the braking element 19 can be increased or reduced by adjusting the adjusting screw.

According to FIG. 8, the setting element 22 is formed in two parts. In this embodiment, the actuating part 24 of the setting element 22 is accessible via an end face 4a of the first hinge part facing the second hinge part 5. For this purpose, the first hinge part 4 comprises an access hole 30 for the actuating part 24, the access hole 30 extending substantially in the direction of displacement of the first articulation axis 8 of the first pivot arm 6, wherein the access hole extends as far as the end face 4a of the first hinge part 4a. The pressing part 23 is accommodated in an opening of the first hinge part 4, which opening extends substantially perpendicular to the direction of displacement of the first articulation axis 8 of the first pivot arm 6. This embodiment of the setting element 22 has the advantage that the end face 4a of the first hinge part 4 in the folded-in position of the components 2, 3 is freely accessible, so that the setting element 22 can be actuated without having to demount the hinge 1. In this embodiment, the actuating part 24 and the pressing part 23 of the setting element 22 are arranged at an angle of essentially 90° relative to each other. In order to transmit force from the actuating part 24 to the pressing part 23, the actuating part 24, in particular an adjusting screw, and the pressing part 23 in the shown embodiment comprise corresponding conical parts 27.

The invention claimed is:

1. A hinge for articulatedly connecting a first component to a second component, with a first hinge part for fastening to the first component and with a second hinge part for fastening to the second component, with a first pivot arm which comprises a first displaceable articulation axis on the first hinge part and a second articulation axis on the second hinge part, wherein the first hinge part comprises a longitudinal guide for the first articulation axis of the first pivot arm, and with a second pivot arm which comprises a first articulation axis on the first hinge part and a second displaceable articulation axis on the second hinge part, wherein the second hinge part comprises a further longitudinal guide for the second articulation axis of the second pivot arm, wherein the first hinge part comprises a damping element, so that a displacement of the first displaceable articulation axis of the first pivot arm along the longitudinal guide of the first hinge part is dampened, wherein the first pivot arm is connected to a brake element which is displaceable along a brake surface of the damping element, wherein a setting element for setting a contact pressure between the damping element and the braking element is provided, wherein the setting element comprises a pressing part, which acts on the damping element, and an actuating part which is accessible on an outer face of the first hinge part, wherein the actuating part of the setting element is arranged in an access hole of the first hinge part, wherein the access hole terminates at an end side of the first hinge part which end side faces the second hinge part.

2. The hinge according to claim 1, wherein the damping element is arranged at least partially within a recess of the first hinge part.

3. The hinge according to claim 1, wherein the damping element comprises a recess in which the brake element is displaceable along two braking surfaces of the damping element.

4. The hinge according to claim 1, wherein the braking element is mounted on the first displaceable articulation axis of the first pivot arm.

5. The hinge according to claim 1, wherein the access hole for the actuating part of the setting element is arranged in a direction of displacement of the first displaceable articulation axis of the first pivot arm.

6. The hinge according to claim 5, wherein the pressing part is arranged at an angle of substantially 90° to the actuating part, the pressing part being arranged in an opening of the first hinge part, which opening extends substantially perpendicular to the direction of displacement of the first displaceable articulation axis of the first pivot arm.

7. The hinge according to claim 1, wherein the actuating part and the pressing part for force deflection between the actuating part and the pressing part comprise conical parts.

8. The hinge according to claim 1, wherein the second hinge part comprises a further damping element for damping a displacement of the second displaceable articulation axis of the second pivot arm along the further longitudinal guide of the second hinge part.

9. The hinge according to claim 1, wherein the second articulation axis of the first pivot arm is arranged on the second hinge part and/or the first articulation axis of the second pivot arm is arranged to be substantially stationary on the first hinge part.

10. The hinge according to claim 1, wherein the first pivot arm and the second pivot arm are connected to each other via a common pivot axis, which extends in a position in which the first hinge part and the second hinge part are arranged parallel to each other.

11. The hinge according to claim 10, wherein the common pivot axis is arranged essentially centrally between end sides facing each other of the first hinge part and the second hinge part.

12. A cladding for an aircraft interior, with a cladding element and a flap element which are connected to each other by means of a hinge, wherein the hinge is formed with a first hinge part for fastening to the first component and with a second hinge part for fastening to the second component, with a first pivot arm which comprises a first displaceable articulation axis on the first hinge part and a second articulation axis on the second hinge part, wherein the first hinge part comprises a longitudinal guide for the first articulation axis of the first pivot arm, and with a second displaceable pivot arm which comprises a first articulation axis on the first hinge part and a second articulation axis on the second hinge part, wherein the second hinge part comprises a further longitudinal guide for the second articulation axis of the second pivot arm, wherein the first hinge part comprises a damping element, so that a displacement of the first displaceable articulation axis of the first pivot arm along the longitudinal guide of the first hinge part is dampened, wherein the first pivot arm is connected to a brake element which is displaceable along a brake surface of the damping element, wherein a setting element for setting a contact pressure between the damping element and the braking element is provided, wherein the setting element comprises a pressing part, which acts on the damping element, and an actuating part which is accessible on an outer face of the first hinge part, wherein the actuating part of the setting element is arranged in an access hole of the first hinge part, wherein the access hole terminates at an end side of the first hinge part which end side faces the second hinge part; wherein the first component is the cladding element and the second component is the flap element.

* * * * *